ELECTRON MULTIPLYING DEVICE

Filed Nov. 18, 1948

INVENTOR.

BY Hainz E. Kallmann

Frederick Seeger

Patented Nov. 11, 1952

2,617,948

UNITED STATES PATENT OFFICE 2,617,948

ELECTRON MULTIPLYING DEVICE

Heinz E. Kallmann, New York, N. Y.

Application November 18, 1948, Serial No. 60,751

3 Claims. (Cl. 250—207)

My present invention relates to electron multiplying devices of all types regardless of whether their input stage is a photo-cathode or a grid controlled amplifier stage, or any other source of amplitude modulated electrons.

Electron multipliers are used for an increasing number of purposes since they provide in a single tube very large amplification over wide frequency ranges. As, by the well known process of liberating secondary electrons on each successive secondary-emitting electrode, or dynode, the output current is directly proportional to the current in the input stage, it follows that the amplification in any of the usual electron multipliers is exactly the same for the D. C. component of the input-stage current as it is for any amplitude modulation thereof.

In many applications, only the modulation of the current is of any interest, but not its D. C. component, the "standing current." In many such cases the modulation is relatively weak, be it the slight modulation of the emission from a photo-cathode due to a modulated light beam in the presence of ambient illumination, or be it the slight modulation imparted to the thermionic cathode current of an amplifier stage by a weak signal voltage on its grid.

In all cases the practicable amplification by means of the present types of electron multipliers is seriously limited by the presence of the proportionately amplified standing current.

If the amplification were made so large as to yield the desired amplitude of modulation at the output stage, then the so much larger standing current would have attained an enormous value, beyond the capacity of any reasonable power supply, and would require very large electrode dimensions to permit the necessary heat dissipation. It is thus necessary to restrict, instead, the amplification of the usual types of electron multipliers to so low values that the standing current in the output stage remains manageable, and to feed the modulation via an A. C. coupling to a subsequent amplifier in order to attain the desired signal level.

It is therefore, the main object of my invention so to modify at least one stage of an electron multiplier cascade that I may be able to introduce means to discriminate between the modulation and the standing current, in particular to amplify the modulation to a greater degree than the standing current.

With the above objects in view, an electron multiplying device in accordance with my present invention comprises in combination a source of an amplitude modulated electron beam, an anode, at least one secondary electron emitting electrode called dynode, arranged between the source of a modulated electron beam and the anode, a control grid also arranged between the source of a modulated electron beam and the anode, and means applying a control voltage to the control grid.

In accordance with a preferred embodiment of my present invention, the control voltage applied to the control grid is a signal voltage varying in dependence of the amplitude modulations of the electron beam, preferably in proportion to variations within at least one predetermined range of frequencies.

I may also provide means supplying a stationary, preferably decelerating bias potential to the control grid, and to apply the above defined signal voltage to the control grid superimposed upon the stationary bias potential thereof.

As mentioned above, my present invention may be applied to any known type of source of a modulated electron beam.

Thus, the source of a modulated electron beam may be a photo-cathode, capable of emitting an electron beam under illumination, and modulate the intensity of the electron beam emitted by this cathode, e. g. by modulating a light beam directed on the cathode.

Another source of a modulated beam of electrons with which my invention is usable may be composed of a cathode emitting a stationary electron beam in combination with a grid arranged in front of this cathode and serving to modulate the intensity of the electron beam leaving the cathode.

Other suitable sources of modulated electron beams will suggest themselves without further enumeration.

As is well known, there are two types of electron multiplier constructions in use.

In the one type, electrons are reflected in a zigzag path between solid dynodes. With this type the path of the liberated secondary electrons depends on certain relations between successive accelerating voltages.

In the other type, the dynodes are pervious to electrons, e. g. each composed of slats forming a louver. Many such louver dynodes may be arranged in parallel planes behind each other, with the amplification on one side of a louver being substantially unaffected by the field on the other side of the louver. The latter group, being preferable for my purposes, will be used to exemplify my invention.

The novel features which I consider as characteristic for my invention are set forth in particular in the appended claims. The invention itself, however, both as to its construction and its method of operation, will be best understood from the following description of specific embodiments when read in connection with the accompanying drawings in which:

Figure 1:
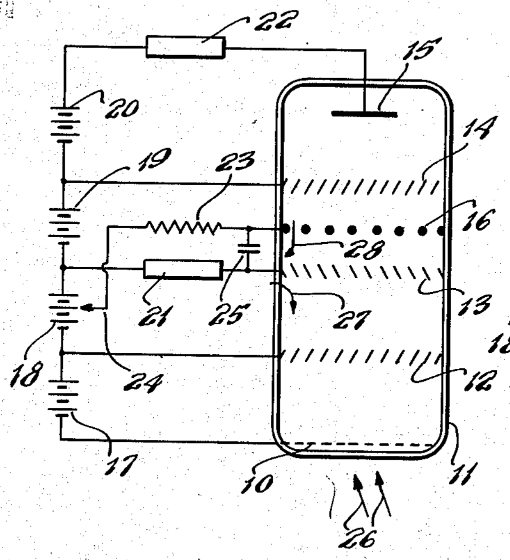
Fig. 1 is a diagrammatic showing of an electron multiplier tube and circuit therefor provided with a control grid in accordance with my present invention.

The electron multiplier arrangement shown in Figure 1 consists of an electron multiplier tube with three stages of electron multiplication, and associated circuit elements.

The photo cathode 10 may be of the transparent type, located on the inside of the glass envelope 11.

The first dynode 12, the second dynode 13, and the third dynode 14 are all of the louver type, arranged in parallel planes, followed by the collector anode 15.

In accordance with my present invention, a control grid 16, e. g. of parallel wires, is located between the second dynode 13, and the third dynode 14.

The device is operated by connecting its photo cathode 10 to the negative terminal of a battery 17, and by connecting the first dynode 12 to the positive terminal of the battery 17 as well as to the negative terminal of a second battery 18.

Similarly, the second dynode 13 is connected, via the impedance 21 to the positive terminal of the battery 18 as well as to the negative terminal of a third battery 19, and finally, the third dynode 14 is connected to the positive terminal of the battery 19, and to the negative terminal of a fourth battery 20.

The collector anode 15 is connected via the load impedance 22 to the positive terminal of the battery 20.

In addition to the above connections, the control grid 16 is connected via the larger resistance 23 to a point negative relative to the dynode 13, e. g. to the tap 24 on battery 18. The condenser 25 is shown as an A. C. coupling between the dynode 13 and the control grid 16.

This arrangement operates as follows:

Modulated light indicated by arrows 26 will impinge on the photo cathode 10 and liberate a certain number of photoelectrons that will be drawn by a positive potential towards the first dynode 12, where they will liberate a proportional number of secondary electrons.

The proportion K of liberated secondary electrons depends on the surface material of the dynode 12, and also rises with the voltage applied. In practical cases it may be of the order of four secondary electrons for each primary electron.

The thus liberated secondary electrons will be drawn by a second positive potential towards the second dynode 13 where they will liberate a second generation of secondary electrons, e. g. again increased by the proportion K. Disregarding the control grid 16, this process will be repeated on the third dynode 14 whose emission will finally be collected by the collector anode 15.

However, due to the new arrangement proposed by me, and described above, both the second-stage current between the dynodes 12 and 13, and the third-stage current between the dynodes 13 and 14, will flow through the impedance 21 in opposite directions as shown by arrows 27 and 28.

As, for values of K larger than one, the latter current is the larger, the potential at the dynode 13 will be slightly more positive than that of the junction between batteries 18 and 19. Thus, the amplification between dynodes 12 and 13 will be slightly increased through the introduction of the impedance 21 while the amplification between the dynodes 13 and 14 will be correspondingly reduced. The resulting change in overall amplification may, however, be disregarded since the two changes in amplification approximately cancel each other and are, in any case, very small.

If the impedance 21 is of sufficiently high value over the range, or ranges, of the desired modulation frequencies, the dynode current will produce an appreciable signal voltage across it, with positive polarity towards the dynode 13 whenever the beam current is increased in the multiplier cascade.

In accordance with my present invention, I propose to apply this signal voltage via the coupling condenser 25 to the control grid 16. In order to make this control effective, I propose to choose the bias potential of the control grid, supplied to it via the resistor 23 from the battery tap 24, so negative that an appreciable part of the electrons liberated at the dynode 13 will not be able to pass through the control grid 16, and will return to the dynode 13.

If then the signal voltage from the impedance 21 is superimposed upon the D. C. control grid bias supplied to it via resistor 23, then a positive excursion of this signal voltage will increase the fraction of electrons liberated at the dynode 13 that may pass towards the third dynode 14, and thus further increase the rise in current, while a decrease in beam current will produce a negative excursion in the control grid voltage, and thus still further decrease the number of electrons reaching the dynode 14.

Thus the current reaching the dynode 14 will be modulated again by the signal modulation it already carries.

As is familiar from amplifier tubes, I may introduce a suitably biased space charge grid—not shown—between the dynode 13 and the control grid 16 and/or I may also introduce a suitably biased screen grid—not shown—between the control grid 16 and the following dynode 14, thereby modifying the action of the control grid 16 in a manner familiar from the design of amplifier tubes. It will also be understood that in place of a grid 16 consisting of parallel wires, I may use any other known electrode structure suitable for the control of an electron beam.

Figure 2:
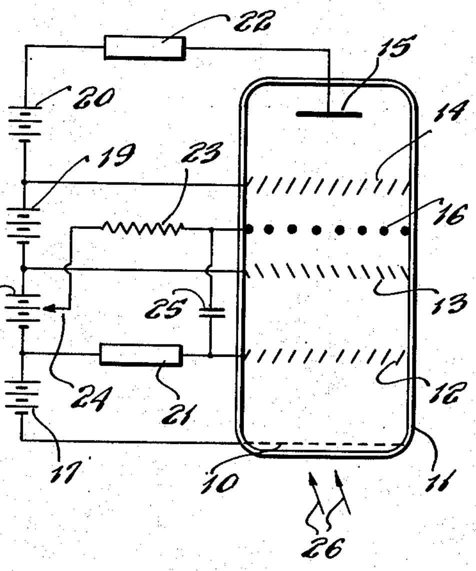
Fig. 2 is a diagrammatic showing of a modified electron multiplier arrangement similar to the one shown in Fig. 1.

Since in the arrangement shown in Figure 1, and described above, the second stage current and the third stage current flow in opposite directions as shown by the arrows 27 and 28, it follows that the signal voltage available on impedance 21 will be reduced to the extent as the flow of electrons from the dynode 13 towards dynode 14 is reduced by the control grid 16. In order to avoid this disadvantage, I might, as shown in Figure 2, provide an arrangement in which the impedance 21 is arranged in the connection between the junction between batteries 17 and 18 and dynode 12, that is a dynode whose effective multiplication factor K is not affected by the action of the control grid 16.

Figure 3:
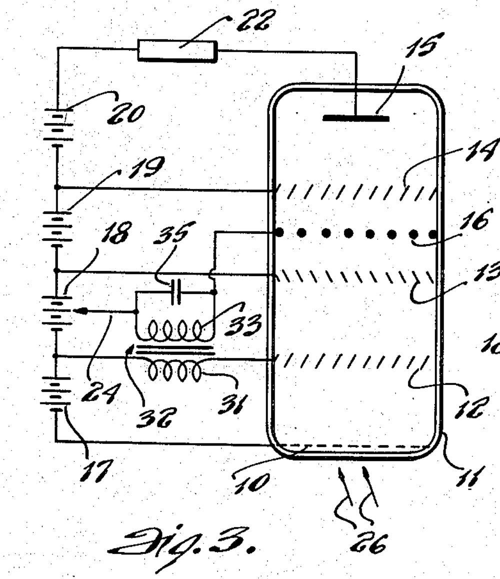
Fig. 3 is also a diagrammatic showing of another modified electron multiplier arrangement similar to the one shown in Fig. 1.

As mentioned above, I may use different means for creating the necessary signal voltage. Thus, for instance, I might modify the arrangement shown in Figure 2 by substituting for the signal coupling comprising the members 21, 23, and 25 a coupling by a transformer 32 (Figure 3) whose primary winding 31 is connected between dynode 12 and the positive terminal of the battery 17, and whose secondary winding 33, replacing the resistance 23, may be connected between the control grid 16 and the battery tap 24. In order to enable selection of the desired frequency range, I may tune the secondary winding 33 of the transformer 32 to resonance by means of the condenser 35, as shown in Figure 3.

By means of this condenser, it is possible to obtain on the control grid 16 a signal voltage varying substantially proportionately to the modulation of the electron beam within the desired frequency range.

Figure 4:
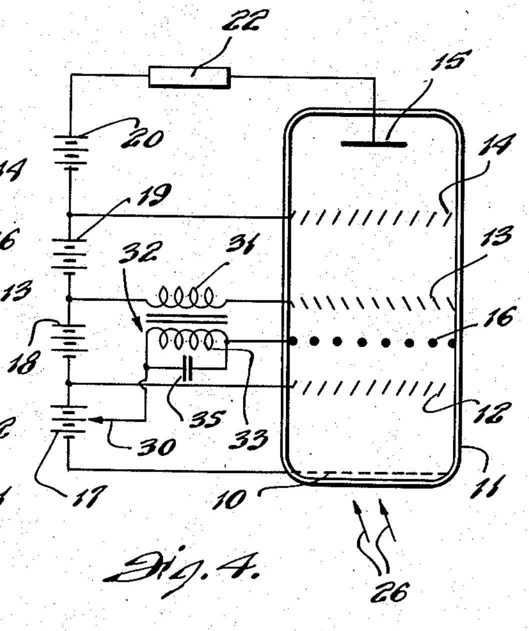
Fig. 4 is also a diagrammatic showing of still a further modified electron multiplier arrangement similar to the one shown in Fig. 1.

I wish to note that I might use both feed-forward, and feed-back, signal coupling. In the former, the signal voltage is derived from a dynode preceding the control grid 16, as exemplified in Figures 1, 2, and 3. In the latter case, the signal voltage is fed back from a dynode following the control grid 16, as shown in Figure 4, where all members are numbered as in Figure 3 except that the biasing potential of the control grid 16 is obtained from tap 30 on the battery 17. Also I may insert one control grid each to modulate the electron current between dynode 12 and dynode 13, and again between dynode 13 and dynode 14, either with the same signal voltage derived from impedance 21 or with other signal voltages similarly derived from other dynode currents.

Moreover, I may apply to one or several such control grids other control voltages, such as gating pulses, or the oscillations of a superheterodyne oscillator, alone or in addition to the above described self-modulating signal voltage.

The dynode load impedances such as the one shown in Figure 1 with 21, should in general be of a high value at the desired modulation frequencies, and may preferably be of low value at all other frequencies including D. C. and the coupling members 23 and 25 should be chosen accordingly.

Since it is assumed that the amplitude of the original modulation is small compared with the standing current, it follows that any nonlinear distortion due to the subsequent selfmodulation will be negligible.

It will be understood that each of the elements described above, or two or more together, may also find a useful application in other types of electron multipliers, differing from the types described above.

While I have illustrated and described the invention as embodied in electron multipliers provided with photo cathodes, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. An electron multiplying device comprising in combination a cathode emitting a modulated electron beam; an anode to collect said modulated electron beam; at least two secondary electron emitting electrodes arranged between said cathode emitting a modulated electron beam and said anode, one of said secondary electron emitting electrodes being the last secondary electron emitting electrode before said anode; impedance means associated with one of said secondary electron emitting electrodes other than said last secondary electron emitting electrode and developing a signal voltage varying proportionately to variations of predetermined components of the modulations of said modulated electron beam; a control grid arranged between said anode and that secondary electron emitting electrode which is associated with said impedance means; and coupling means applying said signal voltage developed by said impedance means to said control grid, so as to vary the intensity of the electron beam passing through said control grid in accordance with the variations of the predetermined components of the modulations of said modulated electron beam, said control grid acting on the electron stream coming from said secondary electron emitting electrode associated with said impedance means.

2. An electron multiplying device comprising in combination a cathode emitting a modulated electron beam; an anode to collect said modulated electron beam; at least two secondary electron emitting electrodes arranged between said cathode emitting a modulated electron beam and said anode, one of said secondary electron emitting electrodes being the last secondary electron emitting electrode before said anode; impedance means associated with one of said secondary electron emitting electrodes other than said last secondary electron emitting electrode and developing a signal voltage varying proportionately to variations of predetermined components of the modulations of said modulated electron beam; a control grid arranged between said anode and that secondary electron emitting electrode which is associated with said impedance means; means supplying a constant bias potential to said control grid; and coupling means applying said signal voltage developed by said impedance means to said control grid superimposed upon said constant bias potential thereof, so as to vary the intensity of the electron beam passing through said control grid in accordance with the variations of the predetermined components of the modulations of said modulated electron beam, said control grid acting on the electron stream coming from said secondary electron emitting electrode associated with said impedance means.

3. An electron multiplying device comprising in combination a cathode emitting a modulated electron beam; an anode upon which said modulated electron beam is impinging; at least two secondary electron emitting electrodes arranged between said cathode emitting a modulated electron beam and said anode, one of said secondary electron emitting electrodes being the last secondary electron emitting electrode before said anode; impedance means associated with one of said secondary electron emitting electrodes other than said last secondary electron emitting electrode and developing a signal voltage varying proportionately to variations of at least one predetermined frequency range of the modulations of said modulated electron beam; a control grid arranged between said anode and said secondary electron emitting electrode which is asssociated with said impedance means; means supplying a constant negative bias potential to said control grid; and coupling means applying said signal voltage developed by said impedance means to said control grid superimposed upon said constant negative bias potential thereof, so as to vary the intensity of the electron beam passing through said control grid in accordance with the variations of the predetermined frequency range of the modulations of said modulated electron beam, said control grid acting on the electron stream coming from said secondary electron emitting electrode associated with said impedance means.

HEINZ E. KALLMANN.

REFERENCES CITED

The following references are of record in the file of this patent:

UNITED STATES PATENTS

| Number | Name | Date |
|---|---|---|
| 2,151,771 | Jarvis et al. | Mar. 28, 1939 |
| 2,181,720 | Barthelemy | Nov. 28, 1939 |
| 2,201,587 | Krawinkel | May 21, 1940 |
| 2,245,119 | Walton | June 10, 1941 |
| 2,294,782 | Jacobsen | Sept. 1, 1942 |
| 2,310,883 | Thom | Feb. 9, 1943 |
| 2,342,986 | Van Den Bosch | Feb. 29, 1944 |